United States Patent Office 3,090,728
Patented May 21, 1963

3,090,728
TITANIC ACID COMPLEXES OF HYDROXY ALIPHATIC CARBOXYLIC ACIDS ANTIPERSPIRANT COMPOSITIONS
Frank Milan Berger, Princeton, and Sophie L. Plechner, Metuchen, N.J. (both % Carter Products Inc., New Brunswick, N.J.)
No Drawing. Filed Feb. 20, 1957, Ser. No. 641,249
9 Claims. (Cl. 167—90)

The present invention relates to novel antiperspirant compositions containing titanium compounds as the active ingredient for retarding or inhibiting perspiration when applied to the human skin. More particularly, the antiperspirant agents are water-soluble titanic acid complexes of hydroxy aliphatic carboxylic acids, having from 2 to 6 carbon atoms. Also, within the scope of the present invention is the method for inhibiting or retarding flow of perspiration from the human skin, utilizing the compositions disclosed herein.

Objects and advantages of the invention will be set forth in part hereinafter and in part will be obvious herefrom, or may be learned by practice with the invention, the same being realized and attained by means of the compositions, steps and methods pointed out in the appended claims.

The invention consists in the novel compositions, steps and methods herein described.

An object of our invention is to provide novel antiperspirant compositions which are highly effective in retarding or preventing the flow of perspiration from the skin.

Another object of our invention is to provide novel antiperspirant compositions which are non-irritating to the skin and which do not attack or deteriorate clothing fibers with which they come in contact.

A still further object of our invention is to provide novel antiperspirant compositions containing water-soluble titanic acid complexes of hydroxy aliphatic carboxylic acids which do not require the incorporation of a protective agent to be non-irritating to the skin and to be non-damaging to clothing fibers with which they come in contact.

Another object of our invention is to provide novel antiperspirant compositions which are non-toxic and which may be used as frequently as desired without effectuating undesirable side reactions.

A further object of our invention is to provide a novel method for inhibiting or retarding the flow of perspiration from the human skin by the utilization of the foregoing compositions.

Prior to the present invention attempts were made to use titanium salts as antiperspirant agents in the form of inorganic acid salts of titanium, such as titanium chloride, titanium sulfate, etc. Solutions of these salts, however, are so highly acidic that these titanium salts are highly irritating to the skin and deteriorate clothing so as to be useless alone as commercially acceptable antiperspirant agents. These salts also precipitate when the pH of their solutions is raised to a value where irritation and fabric damage will not occur. Where such compounds are used without adjustment of their pH there is required the addition of a protective agent to counteract their undesirable properties which not only increases the cost of such compositions but increases the difficulty of maintaining a stable composition.

We have found that the foregoing objects of our invention may be realized by incorporating one or more water-soluble titanic acid complexes of hydroxy aliphatic carboxylic acids having from 2 to 6 carbon atoms in a suitable vehicle having an aqueous phase wherein said complexes are in aqueous solution. The titanic acid complexes forming the active ingredient of our novel composition have been found to be highly effective in inhibiting or retarding the flow of perspiration from the skin. It should be understood, therefore, that our antiperspirant agents do not merely mask or destroy odors of or that result from perspiration, but actually inhibit or retard the flow of perspiration. Moreover, they are advantageously non-irritating to the skin and non-injurious to fabrics.

The "titanic acid complexes of hydroxy aliphatic carboxylic acids" useful in accordance with this invention are believed to be dihydroxy titanylic acids. In this form the titanium having a valence of four and a maximum coordination number of six has in addition to four primary bonds two secondary bonds formed by the acceptance of electrons from a suitable donating atom; in this case the donating atom is an oxygen of the hydroxy aliphatic carboxylic acid. The titanic acid complexes of hydroxy aliphatic carboxylic acids are water soluble compounds which give clear solutions having strongly acid characteristics.

The titanic acid complexes of hydroxy aliphatic carboxylic acids may be prepared by either of the two following procedures:

(1) Titanium sulfate is reacted in aqueous solution with an equivalent quantity of a calcium salt of a hydroxy aliphatic carboxylic acid. In this reaction insoluble calcium sulfate and the titanic acid complex are formed. The calcium sulfate is removed by filtration and the filtrate concentrated to a suitable degree to obtain the desirable concentration of the titanic acid complex.

(2) Tetra alkyl titanate is reacted directly with the desired hydroxy aliphatic carboxylic acid in a suitable non-aqueous solvent such as isopropyl alcohol. The isopropyl alcohol is removed by distillation leaving a residue of the titanic acid hydroxy aliphatic carboxylic acid complex.

In the above described first method wherein the calcium salt of a hydroxy aliphatic carboxylic acid is calcium malate, the resulting complex for the purpose of this invention may be termed "titanium malate." As will be understood by those skilled in the field, if the ratio of atoms of titanium to moles of malic acid is 1:1, the titanium malate is titanium monomalate, while if the ratio of titanium to malic acid is 1:2, the titanium malate is titanium dimalate. In like manner, titanium malate is formed in the second described method wherein the acid employed is malic acid. Examples of other water soluble titanic acid complexes of hydroxy aliphatic carboxylic acids which may be used in this invention and formed in accordance with this invention are the mono and di-acid salts of titanium; titanium monocitrate and dicitrate, titanium monogluconate and digluconate, titanium monoglycollate and diglycollate, and titanium monolactate and dilactate.

The titanic acid complexes of hydroxy aliphatic acids are advantageously prepared in solution and employed for the purpose of this invention without isolation. It is also desirable to adjust the solutions of these titanic acid complexes by the addition of suitable quantities of alkalis such as calcium hydroxide, sodium hydroxide, ammonia, monoethanolamine and triethanolamine. For example, a titanium acid complex of a hydroxy aliphatic carboxylic acid, such as titanium lactate on neutralization with a suitable alkali, such as calcium hydroxide, forms a complex calcium salt. For the purpose of this invention wherein the ratio of titanium to lactic acid in the complex is 1:1 the resulting complex may be termed calcium monolacto titanylate. When the ratio of titanium to lactic acid is 1:2 the resulting complex may be termed calcium dilacto titanylate.

The antiperspirant active ingredient of this invention comprising one or more of the aforementioned titanic acid complexes is effective over a wide range of proportions. Generally, the active ingredient is in the form of a solution having a concentration equivalent to 5 to 15% $TiO_2$. The total composition comprises 5 to 50% by weight of this solution, and preferably 20 to 40% by weight.

It has also been discovered that the presence of a surface-active agent enhances the effectiveness of the active ingredient. The surface-active agent may be non-ionic, cationic or anionic. Examples of suitable non-ionic surface-active agents are polyoxyethylated ether of an alkylated phenol and alkyl phenoxy polyoxyethylene ethanol. Examples of suitable cationic surface-active agents are cetyl trimethyl ammonium bromide and benzalkonium chloride. Examples of suitable anionic surface-active agents are sodium lauryl sulfate and sodium alkyl aryl sulfonate. Generally, the surface-active agent is present in an amount from 0.5 to 5.0% by weight of the total composition.

In order to provide a harmless composition which is highly effective, the pH of the final composition should be as low as possible without introducing an irritation factor due to high acidity. Generally, this pH range is from pH 2.5 to pH 5 and preferably in the range of pH 3 to pH 3.5. Hence, if the concentrations of the ingredients of a particular composition are such that the pH of the composition is outside of the above pH range of 2.5 to 5, a pH adjusting agent is preferably added to adjust and maintain the pH of the composition within this pH range.

The improved antiperspirant compositions of this invention may be prepared in any desired form, including spray solutions, emulsions, lotions, creams, sticks and the like, which include an aqueous carrier.

The titanic acid complexes of hydroxy aliphatic carboxylic acids can be incorporated into cream bases which will maintain the compositions in contact with the skin over extended periods. The cream base forming materials may vary widely in composition but will generally comprise an oily phase held in dispersion by a suitable emulsifier in an aqueous phase which carries the titanium salt, a humectant also preferably being present.

The oily phase of the base may include natural and synthetic oils, waxes and fats, including spermaceti, paraffin, mineral oils, sterols, vegetable oils, and other esters of fatty acids. The emulsifier may comprise any suitable known emulsifying agent, and those found useful include partial esters of fatty acids with glycerine, glycol, or other polyhydric alcohols and their polyoxyethylene ethers, including emulsifiers such as sodium salts of sulfated monoglycericides of coconut oil fatty acids, sodium alkyl sulfates, salts of alkyl aromatic sulfonates, etc. Specific emulsifiers suitable for use in the cream base include sodium N-methyl-N-oleyl taurate (obtainable under the trade name "Igepon T"), sorbitan monolaurate, monopalmitate, and monostearate polyoxyethylene derivatives (obtainable under the trade names "Tween 20" to "Tween 80"), alkylated aryl polyether alcohol (obtainable under the trade name "Triton X45"), and the triethanolamine salt of alkyl aryl sulfonate (obtainable under the trade name "Ultramet 60L). Suitable humectants include glycerine, sorbitol and propylene glycol.

The active ingredient can be incorporated into a lotion which permits the application of the active ingredient in a convenient manner and maintains the composition in contact with the skin over extended periods. The lotion generally consists of an emulsified mixture of the active ingredient in an aqueous phase and a suitable non-aqueous phase. The non-aqueous phase may include natural and synthetic waxes including cetyl alcohol, mineral oils, fatty acid esters and the like. The two phases are generally maintained in stable condition by the use of a suitable emulsifying agent such as the polyethylene esters of higher fatty alcohols. A suitable humectant such as glycerine or propylene glycol may also be employed.

The active ingredient may also be incorporated into a suitable solid wax type stick composition. Such a stick base consists of a mixture of natural and synthetic wax-like materials in such proportions that a soft wax-like composition capable of admixing with the aqueous phase is obtained.

The active ingredient may be dissolved in a suitable mixture of liquid ingredients to obtain a solution suitable for application to the skin by means of a spray forming device. In addition to the active ingredient, such spray solutions contain suitable proportions of alcohol and water along with minor proportions of humectant and surface active agent. The humectant may consist of propylene glycol, glycerine, polyethylene glycol, and the surface-active agent may consist of polyoxyethylene fatty alcohol, polyoxyethylene ether of higher fatty alcohol and similar non-ionic detergents.

The novel compositions of this invention are of high commercial value as antiperspirant compositions. They inhibit or retard the flow of perspiration quickly, effectively and without irritation to the skin or deterioration of fabric in contact therewith. Because of their non-toxic qualities, they may be used as often and in any amount as desired. Furthermore, they require no additional fabric damage-protective agent, which results in decreased costs and avoids the difficulty of maintaining a stable composition, as is often the problem where protective agents are used. In addition, they may be employed at a pH range most effective for antiperspirant action.

In order to describe the invention more specifically examples are now given for the preparation of titanic acid complexes of hydroxy aliphatic carboxylic acids useful in accordance with this invention and antiperspirant compositions formed in accordance with this invention containing these complexes as active ingredients. Unless otherwise indicated the parts given are by weight.

The following Examples I to XII illustrate the preparation of pH adjusted solutions of titanic acid complexes of hydroxy aliphatic carboxylic acids:

*Example I*

Titanyl sulfate crystals, $TiOSO_4.2H_2O$ (196 parts), are dissolved in 750 ml. of water. To this solution are added with stirring 154 parts of calcium lactate pentahydrate powder (U.S.P.). The reaction mixture is filtered and the heavy gypsum cake washed with 300 parts of water, the washings being combined with the filtrate. This clear pale yellow solution contains titanium monolactate formed in the reaction. A slurry of three parts of calcium hydroxide per four parts of water is added slowly with stirring until the pH of the resulting mixture is 3.5. Then the solution is filtered and the heavy filter cake washed with 300 parts of water, the washings being added to the filtrate. The filtrate is evaporated until the concentration of titanium calculated as $TiO_2$ is 110 g.p.l. $TiO_2$. The pH of the solution, now 3.1 following the evaporation, is again adjusted to any desired pH up to pH 5.0 by adding calcium hydroxide slurry. The clear pale yellow solution containing calcium monolacto titanylate has a specific gravity of about 1.145 at 25° C. The solution does not hydrolyze on prolonged boiling. The yield based on titanium is 85 percent.

*Example II*

Titanyl sulfate crystals, $TiOSO_4.2H_2O$ (196 parts), are dissolved in 750 ml. of water and 308 parts of calcium lactate, $Ca(C_3H_5O_3)_2.5H_2O$, are added slowly with stirring. The reaction mixture is filtered and washed with 300 parts of water, the washings being combined with the filtrate. The filtrate contains titanium dilactate formed in the reaction. The pH of the solution is adjusted to 3.7 through addition of small portions of calcium hydroxide slurry. About 49 parts of calcium hydroxide are required. The solution is then clarified by filtration. The clear, yellow filtrate is then evaporated until the concentration of titanium, measured as $TiO_2$, is 125 g.p.l. The clear pale yellow filtrate contains calcium dilacto titanylate. The specific gravity is 1.23 and the pH is 3.3. The solution is stable on boiling and hydrolyzes on raising the pH to 9. The yield based on $TiO_2$ is 83 percent.

Example III

Titanyl sulfate crystals, TiOSO$_4$.2H$_2$O (196 parts), are dissolved in 750 ml. of water. To this solution are added with stirring 154 parts of calcium lactate pentahydrate powder (U.S.P.). The reaction mixture is filtered and the heavy gypsum cake washed with 300 parts of water, the washings being combined with the filtrate. This clear yellow solution contains titanium monolactate formed in the reaction. A solution of 1 part of sodium hydroxide in 1 part of water is added slowly with stirring to the combined filtrate and washings until the pH of the resulting mixture is pH 3.0. Then the solution is filtered and the filter cake washed with 300 parts of water, the washings being added to the filtrate. The solution is then evaporated until the concentration of titanium calculated as TiO$_2$ is 110 g.p.l. TiO$_2$. The pH of the solution is approximately 2.5 and may be adjusted to any desired pH up to pH 5 by adding sodium hydroxide solution. The solution contains sodium monolacto titanylate.

Example IV

Titanyl sulfate crystals, TiOSO$_4$.2H$_2$O (196 parts) are dissolved in 750 ml. of water and 308 parts of calcium lactate, Ca(C$_3$H$_5$O$_3$)$_2$.5H$_2$O, are added slowly with stirring. The reaction mixture is filtered and washed with 300 parts of water, the washings being combined with the filtrate. The filtrate contains titanium dilactate formed in the reaction. A solution of 1 part of sodium hydroxide to 1 part of water is added slowly with stirring to the combined filtrate and washings until the pH of the resulting mixture is pH 3.0. The solution is then filtered and the filter cake washed with 300 parts of water, the washings being added to the filtrate. The solution is then evaporated until the concentration of titanium calculated as TiO$_2$ is 110 g.p.l. TiO$_2$. The pH of the solution is 2.5 and may be adjusted to any desired pH up to pH 5 by adding sodium hydroxide solution. The solution contains sodium dilacto titanylate.

Example V

Titanyl sulfate crystals, TiOSO$_4$.2H$_2$O (196 parts), are dissolved in 750 ml. of water. To this solution are added with stirring 154 parts of calcium lactate pentahydrate powder (U.S.P.). The reaction mixture is filtered and the heavy gypsum cake washed with 300 parts of water, the washings being combined with the filtrate. The filtrate contains titanium monolactate formed in the reaction. Ammonium hydroxide solution, 15 N, is added slowly with stirring to the combined filtrate and washings until the pH of the resulting mixture is pH 3.0. The solution is filtered and the filter cake washed with 300 parts of water, the washings being added to the filtrate. The solution is then evaporated until the concentration of titanium calculated as TiO$_2$ is 110 g.p.l. TiO$_2$. The pH of the solution is 2.5 and may be adjusted to the desired pH by adding ammonium hydroxide solution. The solution contains ammonium monolacto titanylate.

Example VI

Titanyl sulfate crystals, TiOSO$_4$.2H$_2$O (196 parts), are dissolved in 750 ml. of water and 308 parts of calcium lactate, Ca(C$_3$H$_5$O$_3$)$_2$.5H$_2$O, are added slowly with stirring. The reaction mixture is filtered and washed with 300 parts of water, the washings being combined with the filtrate. The filtrate contains titanium dilactate formed in the reaction. Triethanolamine, cosmetic grade, is added slowly with stirring to the combined filtrate and washings until the pH of the solution is pH 3.0. The solution is then filtered and the filter cake washed with 300 parts of water, the washings being added to the filtrate. The solution thus obtained is evaporated until the concentration of titanium calculated as TiO$_2$ is 110 g.p.l. of TiO$_2$. The pH of the solution is pH 2.5 and may be adjusted to a desired pH by addition of triethanolamine. The solution contains triethanolamine dilacto titanylate.

Example VII

Titanyl sulfate crystals, TiOSO$_4$.2H$_2$O (196 parts), are dissolved in 750 ml. of water. To this solution are added with stirring 154 parts of calcium lactate pentahydrate powder (U.S.P.). The reaction mixture is filtered and the heavy gypsum cake washed with 300 parts of water, the washings being combined with the clear pale yellow filtrate. The filtrate contains titanium monolactate formed in the reaction. Monoethanolamine, cosmetic grade, is added slowly with stirring to the combined washings and filtrate until the pH reaches pH 3.0. The solution is then filtered and the filter cake washed with 300 parts of water, the washings being added to the filtrate. The solution is evaporated until the concentration of titanium calculated as TiO$_2$ is 110 g.p.l. of TiO$_2$. The pH of the solution is pH 2.5 and may be adjusted to a desired pH by addition of monoethanolamine. The solution contains monoethanolamine monolacto titanylate.

Example VIII

Titanyl sulfate crystals, TiOSO$_4$.2H$_2$O (196 parts), are dissolved in 750 ml. of water. To this solution are added with stirring 154 parts of calcium lactate pentahydrate powder (U.S.P.). The reaction mixture is filtered and the heavy gypsum cake washed with 300 parts of water, the washings being combined with the clear pale yellow filtrate. The resulting solution contains titanium monolactate. A slurry of 3 parts of magnesium oxide per 4 parts of water is added slowly with stirring until the pH of the resulting mixture is pH 3.0. Then the solution is filtered and the filter cake washed with 300 parts of water, the washings being added to the filtrate. The filtrate is evaporated until the concentration of titanium calculated as TiO$_2$ is 110 g.p.l. of TiO$_2$. The pH of the resultant solution is pH 2.6 and may be adjusted to the desired pH by adding magnesium hydroxide slurry. The solution contains magnesium monolacto titanylate.

Example IX

To 284 parts of tetraisopropyl titanate are added 268 parts of d,l-malic acid (M.P. 128° C.) dissolved in 200 parts of isopropyl alcohol. The solution becomes light yellow and heat is evolved. The isopropyl alcohol is removed by vacuum distillation leaving a clear yellow glassy residue which is essentially pure titanium dimalate (1:2 mole ratio). Water (500 parts) is added and the glassy solid slowly dissolves yielding a clear solution, pH approximately 1. The pH of the solution is adjusted to 3 through addition of approximately 165 parts of powdered sodium carbonate. The concentration of the solution is adjusted through addition of water to 120 g.p.l. TiO$_2$. This solution containing sodium dimalo titanylate is stable at 100° C.

Example X

To 460 parts of a titanyl sulfate solution containing 80 parts of TiO$_2$, and 108 parts of H$_2$SO$_4$ is slowly added with stirring 500 parts of powdered calcium gluconate, Ca(C$_6$H$_{11}$O$_7$)$_2$.H$_2$O. An exothermic reaction occurs yielding a thick yellow paste. Water (200 parts) is added to maintain fluidity and the mixture allowed to stand overnight after which it is filtered and the residue repulped with 250 parts of water and again filtered. The combined filtrates amount to 720 parts of clear yellow solution containing 76 parts of TiO$_2$ and representing 95 percent recovery.

Methyl alcohol (4000 parts) is added slowly to the solution with rapid stirring yielding a white precipitate which is filtered then repulped with 4000 parts of methyl alcohol and again filtered. The product, dried at 75° C., amounts to 228 parts of a fine white powder containing 28.7 percent Ti calculated as TiO$_2$. This product is essentially pure titanium digluconate.

The overall yield from titanyl sulfate solution is 81.5 percent based on titanium.

The product decomposes at about 130° C. It is very soluble in water but hydrolyzes on boiling. The solutions are stable below a pH of 9.

The white powder (35 parts) is dissolved in water to make 120 parts of solution (specific gravity 1.2). The pH of this solution is raised to 4 through addition of concentrated aqueous ammonia. This requires approximately 0.4 mole NH$_4$OH per mole of TiO$_2$. The final soluble TiO$_2$ concentration is 100 g.p.l. The solution contains ammonium diglucono titanylate.

*Example XI*

To 230 parts of titanyl sulfate solution containing 40 parts TiO$_2$ and 49 parts H$_2$SO$_4$ are added 96 parts of citric acid. The resulting solution contains titanium monocitrate. To this solution are added 140 parts of concentrated aqueous ammonia (specific gravity 0.9), approximately 2.25 moles per mole TiO$_2$. The clear light yellow solution contains 112 g. p.l. TiO$_2$ and has a pH of 2.8. The specific gravity is 1.3. On boiling this solution hydrolyzes slowly. This solution contains ammonia monocitro titanylate.

*Example XII*

Crystalline glycolic acid (152 parts) is added to 284 parts of tetraisopropyl titanate dissolved in 500 parts of isopropyl alcohol. The mixture is refluxed for one hour then the alcohol is removed by vacuum stripping leaving a residue of titanium diglycolate. The amorphous white residue is dissolved in 500 parts water and 50 parts triethanolamine (C.P.) added. This corresponds to approximately one-third mole of triethanolamine per mole of TiO$_2$. The solution contains 135 g.p.l. TiO$_2$ and has a pH of 2.5. The clear almost colorless solution containing triethanolamine diglycolo titanylate is stable at room temperature but hydrolyzes rapidly on heating or elevation of the pH.

The following examples XIII to XXIV illustrate the preparation of a number of antiperspirant compositions formed in accordance with this invention.

*Example XIII*

| | Parts |
|---|---|
| Solution of sodium monolacto titanylate as prepared in Example III, adjusted to ph 3.8 | 30 |
| Polyoxyethylated ether of an alkylated phenol | 7 |
| Water to 100 parts. | |

*Example XIV*

| | Parts |
|---|---|
| Solution of calcium monolacto titanylate as prepared in Example I, adjusted to pH 4.0 | 30 |
| Cetyl trimethyl ammonium bromide | 0.5 |
| Water to 100 parts. | |

*Example XV*

| | Parts |
|---|---|
| Solution of calcium dilacto titanylate as prepared in Example II, adjusted to pH 3.0 | 10 |
| Triethanolamine dilacto titanylate solution as prepared in Example VI, adjusted to pH 3.0 | 10 |
| Non-ionic wetting agent | 0.5 |
| Water to 100 parts. | |

*Example XVI*

| | Parts |
|---|---|
| Solution of monoethanolamine monolacto titanylate as prepared in Example VII, adjusted to pH 2.7 | 30 |
| Sodium lauryl sulfate | 3 |
| Water to 100 parts. | |

*Example XVII*

An example of an antiperspirant spray composition is as follows:

| | Parts |
|---|---|
| Solution of calcium dilacto titanylate as prepared in Example II, adjusted to pH 3.5 | 30 |
| Alcohol, SDA 40 | 15 |
| Non-ionic wetting agent | 1 |
| Water | 54 |
| Perfume, qs. | |

*Example XVIII*

An example of liquid emulsion for lotion purposes is as follows:

| | Parts |
|---|---|
| Solution of ammonium monolacto titanylate as prepared in Example V, adjusted to pH 2.9 | 25 |
| Propylene glycol | 10 |
| Glyceryl monostearate | 3 |
| Sodium lauryl sulfate | 1 |
| Cetyl alcohol | 1 |
| Water | 40 |
| Perfume, qs. | |

*Example XIX*

An example for an antiperspirant cream is as follows:

| | Parts |
|---|---|
| Solution of calcium monolacto titanylate as prepared in Example I, adjusted to pH 3.1 | 30 |
| Non-ionic emulsifier | 3 |
| Polyethylene glycol 300 | 10 |
| Isopropyl palmitate | 3 |
| Glyceryl monostearate | 12 |
| Spermaceti | 2.5 |
| Cetyl alcohol | 2.5 |
| Titanium dioxide | 0.5 |
| Water | 36.5 |
| Perfume, qs. | |

*Example XX*

An example of an antiperspirant stick formula is as follows:

| | Parts |
|---|---|
| Solution of sodium monolacto titanylate as prepared in Example III, adjusted to pH 3.0 | 20 |
| Alcohol, SDA 40 | 71.75 |
| Sodium hydroxide | 0.75 |
| Stearic acid | 4.5 |
| Glycerol | 3 |

*Example XXI*

A liquid emulsion for lotion purposes:

| | Parts |
|---|---|
| Solution of sodium dimalo titanylate as prepared in Example IX adjusted to pH 3 | 25 |
| Propylene glycol | 10 |
| Glyceryl monostearate | 3 |
| Sodium lauryl sulfate | 1 |
| Cetyl alcohol | 1 |
| Water | 40 |
| Perfume, qs. | |

*Example XXII*

Antiperspirant cream composition:

| | Parts |
|---|---|
| Solution of triethanolamine diglycolo titanylate as prepared in Example XII adjusted to pH 3.0 | 30 |
| Non-ionic emulsifier | 3 |
| Polyethylene glycol 300 | 10 |
| Isopropyl palmitate | 3 |
| Glyceryl monostearate | 12 |
| Spermaceti | 2½ |
| Cetyl alcohol | 2½ |
| Titanium dioxide | 0.5 |
| Water | 36.5 |
| Perfume, qs. | |

Example XXIII

Antiperspirant solution:

| | Parts |
|---|---|
| Solution of ammonium diglucono titanylate as prepared in Example X adjusted to pH 3.0 | 30 |
| Polyoxyethylated ether of an alkylated phenol | 7 |
| Water to 100 parts. | |

Example XXIV

Antiperspirant solution:

| | Parts |
|---|---|
| Solution of ammonia monocitro titanylate as prepared in Example XI adjusted to pH 2.8 | 30 |
| Polyoxyethylated ether of an alkylated phenol | 7 |
| Water to 100 parts. | |

The invention in its broader aspects is not limited to the specific compositions, steps and methods described, but departures may be made therefrom within the scope of the accompanying claims without departing from the principles of the invention and without sacrificing its chief advantages.

What is claimed is:

1. An antiperspirant composition comprising an oil-water emulsion vehicle having dissolved therein an antiperspirant agent selected from the group consisting of titanic acid complexes of hydroxy aliphatic carboxylic acids having from 2 to 6 carbon atoms and mixtures thereof, said composition having a pH in the range of about 2.5 to 5.

2. An antiperspirant composition according to claim 1 wherein the composition has a pH in the range of 3 to 3.5.

3. The composition of claim 1 wherein the antiperspirant agent is in the form of an aqueous solution of titanic acid complexes of hydroxy aliphatic carboxylic acids having from 2 to 6 carbon atoms and mixtures thereof.

4. An antiperspirant stick composition comprising an alcohol-soap base having dissolved therein in aqueous solution an antiperspirant agent selected from the group consisting of titanic acid complexes of hydroxy aliphatic carboxylic acids having from 2 to 6 carbon atoms and mixtures thereof.

5. The antiperspirant composition of claim 4 wherein the composition has a pH in the range of 2.5 to 5.

6. An antiperspirant spray composition comprising a solution of water, a surface active agent, and an antiperspirant agent selected from the group consisting of titanic acid complexes of hydroxy aliphatic carboxylic acids having from 2 to 6 carbon atoms and mixtures thereof, said composition having a pH in the range of about 2.5 to 5.

7. An antiperspirant spray composition consisting essentially of a solution of water, a surface active agent, alcohol, and an antiperspirant agent selected from the group consisting of titanic acid complexes of hydroxy aliphatic carboxylic acids having from 2 to 6 carbon atoms and mixtures thereof, said composition having a pH in the range of about 2.5 to 5.

8. The method for inhibiting the flow of perspiration from the human skin comprising applying thereto an antiperspirant composition comprising a vehicle having an aqueous phase and having dissolved therein in aqueous solution an antiperspirant agent selected from the group consisting of titanic acid complexes of hydroxy aliphatic carboxylic acids having from 2 to 6 carbon atoms and mixtures thereof, said composition having a pH in the range of about 2.5 to 5.

9. A method of inhibiting perspiration comprising applying to the skin a composition comprising an aqueous solution of titanium lactate having a pH of from about 2.5 to about 5.0.

References Cited in the file of this patent

UNITED STATES PATENTS

| 760,319 | Dreher | May 17, 1904 |
|---|---|---|
| 1,059,740 | Liebknecht | Apr. 22, 1913 |
| 1,818,699 | Dusenbury | Sept. 14, 1928 |
| 2,227,508 | Nelson | Jan. 7, 1941 |
| 2,236,387 | Wallace | Mar. 25, 1941 |
| 2,498,514 | Van Mater | Feb. 21, 1950 |
| 2,734,847 | Berger | Feb. 14, 1956 |

OTHER REFERENCES

Grote: Drug and Cos. Ind., December 1946, vol. 59, No. 6, pp. 776–777, 872–875.

Drug and Cosmetic Industry, vol. 65, No. 6, December 1949, p. 696.

Snell: Amer. Perfumer and Ess. Oil Review, September 1951, vol. 58, pp. 171–176.

UNITED STATES PATENT OFFICE
CERTIFICATE OF CORRECTION

Patent No. 3,090,728                                             May 21, 1963

Frank Milan Berger et al.

It is hereby certified that error appears in the above numbered patent requiring correction and that the said Letters Patent should read as corrected below.

Column 2, lines 42 and 43, for "titaniup" read -- titanium --; column 3, line 55, for "name "Ultramet 60L")." read -- name "Ultrawet 60L"). --.

Signed and sealed this 3rd day of December 1963.

(SEAL)
Attest:
ERNEST W. SWIDER

EDWIN L. REYNOLDS

Attesting Officer                                    Acting Commissioner of Patents